United States Patent Office 3,172,771
Patented Mar. 9, 1965

3,172,771
METHOD OF MAKING A BLOOD ADHESIVE
AND THE PRODUCT THEREOF
Gerald W. Lee, Seattle, Wash., assignor, by mesne assignments, to Weyerhaeuser Company, Tacoma, Wash., a corporation of Washington
No Drawing. Filed Apr. 26, 1961, Ser. No. 105,552
12 Claims. (Cl. 106—124)

This invention concerns an improved blood adhesive and the method of providing such improvement. It is particularly applicable to adhesives used for the manufacture of plywood and other laminated ligno-cellulosic products.

Fresh animal blood and certain types of dried animal bloods are soluble in aqueous, alkaline solutions and are useful as a base for adhesives. Mixtures of fresh and dry bloods may also be used as an adhesive base.

Blood glues are generally made commercially by mixing dry blood with suitable dry extenders such as wood flour or other ligno-cellulosic materials, chemicals, and defoaming agents. The resulting dry powder is sold for conversion to a wet adhesive by the user. In the usual practice, the user mixes the dry powder with water and alkaline conditioning chemicals. While an adhesive may be prepared by adding a single alkaline chemical to the blood-water mixture, it is customary to add a combination of chemicals, such as calcium hydroxide, sodium hydroxide and sodium silicate, according to specific mixing instructions supplied by the adhesive manufacturer. In addition various fungicides or phenolformaldehyde resins in small proportions are frequently added to the adhesive to protect the adhesive bond from destruction by fungi or microorganisms.

Because of its excellent adhesive properties only a small amount of blood is needed to achieve a superior bond. This is an advantage in that the cost of the adhesive can be kept low if the requisite small amount of blood can be properly applied to the surfaces being bonded. The utilization of small amounts of blood for bonding also presents a disadvantage in that such small amounts are difficult to apply to the surfaces being bonded when the surfaces are rough and absorbent as in the case of wood.

A dilute blood solution can be used to deposit a small amount of blood solids on the surface, however, if a blood solution is diluted sufficiently with water to achieve the maximum economy of spread it will be very thin and will rapidly soak beneath the wood surface. If the blood migrates too far below the surface a poor bond will result.

The problem can be minimized by increasing the viscosity of the dilute blood solution itself. The thickening, or increase in viscosity, also helps the adhesive transfer from conventional spreader rolls to the wood surface smoothly, and a very low spread of blood solids can be applied. The high viscosity inhibits the solution from soaking into the wood and thus helps hold the blood solids on the surface where the bonding is accomplished.

Blood from hogs has been found to produce lower viscosity in adhesives than other species such as beef, but the adhesive manufacturer is faced with the problem of using blood from both beef and hogs. He frequently has no control over the species ratio available to him in his raw materials because it is conventional practice in some slaughtering operations to mix all the blood species before drying. Natural production variables cause the blood ratio to vary substantially and in an unknown way, thus creating a viscosity control problem for the adhesive manufacturer.

In accordance with this invention a novel and valuable method of making improved alkaline blood adhesives has been discovered. The method comprises co-reacting small amounts of magnesium ions and polyvalent heavy metal ions of cobalt or chromium or mixtures of cobalt and chromium with the alkaline blood to provide increased viscosity. The ions are preferably supplied as soluble metal salts. Chromium ions have been found to react somewhat more slowly than cobalt ions; however their thickening action is comparable.

Small amounts of the metal ions have been found to cause a relatively large increase in viscosity. In general, as the amount of magnesium ions and cobalt and/or chromium ions is increased the viscosity of the blood solution will increase.

By varying the amount of metal ions added to the blood the adhesive manufacturer can compensate for a varying blood species ratio and produce an adhesive with constant viscosity properties from batch to batch.

The exact manner in which the metal ions are added to the blood is not deemed critical. They may be added to either neutral or alkaline blood systems. They may also be added either to the dry blood or to blood solutions. When added to an alkaline blood system the thickening action becomes apparent immediately. A neutral blood solution however is not thickened substantially by the metal ions until after the solution is made alkaline.

The lack of thickening of neutral blood solutions is advantageous and allows the production of a new and useful type of soluble dry blood. The metal ions, in the form of appropriate metal salts or salt solutions, may be added to either fresh or reconstituted liquid blood before it is dried. Since no appreciable thickening occurs the solution can be readily dried in conventional equipment. The dry blood will then contain the metal ions in intimate admixture and the product forms an excellent base for blood adhesives. Upon being made alkaline during the conversion to a wet adhesive the blood thickens in the manner previously described.

The metal ions, in the form of dry metal salts, may also be physically mixed with the dry blood in the proper amounts and the mixture used to prepare a wet adhesive.

Another method of achieving the advantages of the invention is to add the metal ions to the wet adhesive mixture either as salts in water soluton or in the dry state. This addition may be made either before or after the alkaline chemicals are added to the blood-water mixture. When dry salts are added to the wet adhesive the mixture should be stirred until the salts have fully dissolved.

The type and amount of metal ions employed is important in achieving the thickening action desired. Magnesium ions are used in combination with ions of cobalt and/or chromium to achieve the maximum thickening action. It is preferred to employ magnesium ions, in the form of magnesium chloride, in cooperation with cobalt ions, in the form of cobalt sulfate. Similar results can also be achieved with cobalt chloride and magnesium sulfate or with the chlorides or sulfates of both salts.

In formulating adhesives the amount of magnesium ions used preferably will be below about 2% and the amount of cobalt or chromium ions will preferably be below about 0.25% both based on the weight of dry blood solids.

The ratio of magnesium ions to cobalt or chromium ions is not critical, however, practical considerations of cost, need and availability will influence the ratio used. When the ions are added as hydrated salts a typical ratio is to use 5% of magnesium chloride hexahydrate and 0.5% of cobalt chloride hexahydrate based on the weight of dry blood solids.

For the purposes of illustrating the invention the viscosity of aqueous, alkaline blood solutions is conveniently determined with a Brookfield Viscometer. The following method of preparing the solutions and measuring their viscosity is useful to illustrate the viscosity effects:

(1) In a 400 ml. beaker disperse 30.0 grams of dry blood uniformly in 135 grams of water at 25° C.
(2) Add 75 grams of 1.0 N (normal) sodium hydroxide solution rapidly and stir the mixture for 4 minutes until it is homogeneous.
(3) Six minutes after adding the sodium hydroxide solution the viscosity is measured with a Brookfield Viscometer using a speed of 20 r.p.m. and the largest spindle which will give a reading. A drop or two of N-amyl alcohol or octyl alcohol may be added to defoam the solution if necessary before measuring the viscosity.

When fresh blood or a reconstituted blood solution is used an appropriate correction for the total water content should be made to keep the total solution weight equal to 240 grams. The metal ions are added as salts after the dry blood is dispersed in the water when it is desired to measure the viscosity increase caused by such ions.

Using the above method of number of measurements of the thickening effect of the metal ions on blood have been obtained and are illustrated in the following examples:

EXAMPLE I

This example illustrates the viscosity results of the above test method when magnesium ions and cobalt and/or chromium ions are not present.

Thirty (30) grams of spray-dried, soluble hog blood were dispersed in 135 grams of water of 25° C. using a 400 ml. glass beaker as a container. Stirring was done mechanically at a speed slow enough to avoid splattering, and to avoid incorporating a large amount of air beneath the surface. To this mixture there was next added rapidly 75 gms. of 1.0 N sodium hydroxide solution followed by stirring for 4 minutes.

Six minutes after adding the sodium hydroxide solution the mixture was subjected to viscosity measurement at 20 r.p.m. in the Brookfield Viscometer. The viscosity was also measured at 30 minutes and 60 minutes after adding the sodium hydroxide solution to give an indication of the change of the viscosity with time. Between measurements the beaker was immersed in a 25° C. water bath to insure constant temperature.

The results are shown in the following table.

Time of measurement after
  addition of NaOH:            Viscosity, centipoises
  6 ------------------------------------------- 31
  30 ------------------------------------------ 22
  60 ------------------------------------------ 20

EXAMPLE II

The above example was modified to incorporate magnesium ions and cobalt ions according to the invention.

Thirty (30) grams of the same spray-dried soluble hog blood as used in Example I were dispersed in 135 grams of water containing 5% of magnesium chloride hexahydrate and 0.5% of cobalt chloride hexahydrate based on the blood solids. To the mixture there was then added 75 grams of 1.0 N sodium hydroxide solution followed by stirring for 4 minutes. The viscosity of the mixture was measured as described in Example I. The following results were found.

Time of measurement after
  addition of NaOH:            viscosity, centipoises
  6 ------------------------------------------ 295
  30 ----------------------------------------- 220
  60 ----------------------------------------- 193

The metal ions used in Example II have been found to individually thicken alkaline blood solutions, however, to a lesser degree than when used together as in Example II.

It has also been found that the viscosity achieved by joints use of the metal ions is considerably greater than the arithmetical sum of the individual viscosities. This is surprising and indicates a synergistic effect when the metal ions are used in the same system at the same time.

This synergistic effect is apparent when comparing the viscosity of solutions containing the individual metal ions and solutions containing the metal ions in combination.

EXAMPLE III

An aqueous, alkaline blood mixture identified as mix A was prepared according to Example I, however the dry blood was first dispersed in 135 grams of water containing 0.5% of cobalt chloride hexahydrate based on the weight of blood solids. The mixture was made alkaline by addition of 75 mls. of 1.0 N sodium hydroxide solution followed by stirring for 4 minutes. The resulting viscosity is shown in Table A below.

In an analogous manner a second aqueous, alkaline blood mixture identified as mix B was prepared containing 5% of magnesium chloride hexahydrate based on the weight of blood solids. The viscosity of this mixture is also shown in Table A below.

A third mix, identified as mix C, was prepared containing 0.5% of chromic sulfate based on the weight of blood solids. The viscosity of this mixture is shown in Table B.

The viscosity results of Examples I, II, and III are set forth in Table A to illustrate the synergistic effect on viscosity of using magnesium ions and cobalt ions singly and in combination.

*Table A*

| Condition | Example | Viscosity in cps. at 25° C. measured at the times shown after addition of the NaOH | | |
|---|---|---|---|---|
| | | 6 [1] | 30 [1] | 60 [1] |
| Cobalt and magnesium ions absent. | I | 31 | 22 | 20 |
| Cobalt ion used alone | III—mix A | 53 | 54 | 46 |
| Magnesium ion used alone. | III—mix B | 125 | 83 | 72 |
| Arithmetical sum of mixes A and B. | III | 178 | 137 | 118 |
| Cobalt and magnesium ions used jointly. | II | 295 | 220 | 193 |

[1] Time of measurement.
NOTE.—Chromium ions may be used instead of cobalt ions.

EXAMPLE IV

A mixture of blood, water, magnesium chloride, and sodium hydroxide was prepared according to Example II, however 0.5% of chromic sulfate was substituted for the cobalt chloride hexahydrate. The resulting viscosities were—

Time of measurement after    Viscosity,
  addition of NaOH:          centipoises
  6 _____ 55
  30 _____ 370
  60 _____ 370

The somewhat slower reaction of chromium is shown by the low 6 minute viscosity.

The synergistic effect of chromium ions used in place of cobalt ions is illustrated as follows:

Table B

| Condition | Example | Viscosity in cps. at 25° C. measured at the times shown after addition of the NaOH | | |
|---|---|---|---|---|
| | | 6 [1] | 30 [1] | 60 [1] |
| Chromium and magnesium ions absent. | I | 31 | 22 | 20 |
| Chromium ions used alone. | III—mix C | 25 | 22 | 20 |
| Magnesium ions used alone. | III—mix B | 125 | 83 | 72 |
| Arthmetical sum of mixes B and C. | | 150 | 105 | 92 |
| Chromium and magnesium ions used jointly. | IV | 55 | 370 | 370 |

[1] Time of measurement.

The synergistic thickening effect of the joint use of magnesium ions and cobalt ions is also manifested in blood adhesive formulations.

EXAMPLE V

A basic blood adhesive was prepared by mixing the following ingredients in the amount shown.

Ingredient:                                    Amount, parts by weight
  Water @ 70° F. _____ 100
  Spray-dried hog blood _____ 75
  Wood flour _____ 23
  Defoamer (pine oil or equivalent proprietary defoamers) _____ 2
              Mix 5 minutes
  Water @ 70° F. _____ 350
              Mix 2 minutes
  Calcium hydroxide _____ 6
  In water _____ 12
              Mix 10 minutes
  Sodium hydroxide (flake) _____ 9
  In water _____ 9
              Mix 2 minutes
  Sodium silicate solution (N grade) _____ 30
              Mix 3 minutes Six minutes after the last mixing period the mixture was subjected to a Brookfield viscosity measurement which was repeated at 30 minutes and 60 minutes elapsed time. The results are shown in Table C below.

EXAMPLE VI

Following the same basic mix described in Example V three mixes hereafter identified as A, B, and C were made which included the metal ions added in the form of water solutions of their salts. In each case the total water content of the mix was adjusted to a constant 450 parts. Mix A contained 25 mls. of a 10% solution of magnesium chloride hexahydrate; mix B contained 5 mls. of a 5% solution of cobalt sulfate monohydrate; and mix C contained both the salt solutions in the amounts used in mixes A and B.

The resulting viscosity values are tabulated in Table C.

Table C

| Condition | Example | Viscosity in cps. at 25° C. measured at the times shown after completion of mixing | | |
|---|---|---|---|---|
| | | 6 [1] | 30 [1] | 60 [1] |
| Chromium and magnesium ions absent. | V | 2,880 | 2,450 | 2,400 |
| Magnesium ions used alone. | VI—mix A | 9,250 | 7,000 | 6,400 |
| Cobalt ions used alone | VI—mix B | 58,000 | 45,600 | 50,000 |
| Arithmetical sum of mixes A and B. | | 67,250 | 61,600 | 56,400 |
| Cobalt and magnesium ions used jointly. | VI—mix C | 88,800 | 77,000 | 76,000 |

[1] Time of measurement.

The viscosity results for the cobalt and magnesium ions, used jointly in mix C, are substantially in excess of their individual arithmetical sum indicating a synergistic viscosity effect.

EXAMPLE VII

A dry adhesive base mixture was prepared by blending the following.

Ingredient:                               Parts by weight
  Spray-dried soluble hog blood _____ 120.0
  Spray-dried soluble beef blood _____ 30.0
  Wheat flour _____ 10.0
  Wood flour _____ 34.5
  Sander dust _____ 20.0

A wet adhesive for plywood was prepared from the above dry base by mixing the following ingredients.

Ingredient:                               Parts by weight
  Water @ 77° F. _____ 300
  Dry adhesive base _____ 200
              Mix 5 minutes
  Water @ 77° F. _____ 850
  10% solution of magnesium chloride hexahydrate _____ 50
  5% solution of cobalt sulfate monohydrate _ 10
              Mix 5 minutes
  Calcium hydroxide _____ 12
  In water _____ 24
              Mix 10 minutes
  Sodium hydroxide (flakes) _____ 15
  In water _____ 15
              Mix 2 minutes
  Sodium silicate solution (N grade) _____ 60
              Mix 2 minutes
  Thermosetting phenol-formaldehyde resin __ 20
              Mix 3 minutes

EXAMPLE VIII

A series of 3-ply plywood panels were prepared from the wet adhesive of Example VII. For each panel a birch veneer having a thickness of 1.5 millimeters was used as a core and was coated on both sides with the wet adhesive at a rate of 21–22 grams of wet adhesive per square foot of double glue line. This core was then placed between two birch face veneers of 1.5 millimeters thicknesses with the grain of each adjacent veneer disposed at an angle in conventional plywood fashion.

Enough panels were prepared to provide a range of assembly times before pressing. The assembly times used were 2, 10, and 20 minutes.

When the assembly time had elapsed the panels were pressed for 5 minutes at a platen temperature of 230° F. and a pressure of 240 pounds per square inch using 2 panels in each press opening.

The finished panels were very well bonded. Conventional shear test specimens were made and tested and showed an average dry shear strength of 326 pounds per square inch.

After soaking in water for 24 hours and being broken while wet other shear test specimens showed an average wet shear strength of 282 pounds per square inch.

What is claimed is:

1. A method of producing an adhesive from an aqueous blood solution derived from blood selected from the group consisting of fresh blood, dried soluble blood, and mixtures thereof, comprising the steps of: adding to said blood solution a material capable of supplying magnesium ions present in an amount up to 2% based on the weight of the blood solids; mixing in an ion-containing material present in an amount up to .25% based on the weight of the blood solids selected from the group consisting of cobalt ions, chromium ions, and mixtures thereof; then, adding a material capable of making the solution alkaline, said material providing adhesive properties to said blood solution.

2. A method of producing an adhesive from an aqueous blood solution derived from blood selected from the group consisting of fresh blood, spray-dried soluble blood, and mixtures thereof, comprising the steps of: adding to said solution materials capable of supplying magnesium ions present in an amount up to 2% based on the weight of the blood solids and cobalt ions present in an amount up to .25% based on the weight of the blood solids; and then adding sodium hydroxide, calcium hydroxide, and sodium silicate to provide adhesive properties to said blood solution.

3. A dry adhesive base, consisting of: a mixture of dry blood solids soluble in an aqueous alkaline solution, a soluble magnesium salt present in an amount up to 5% based on the weight of the blood solids, and a soluble cobalt salt present in an amount up to .5% based on the weight of the blood solids.

4. A wet adhesive, consisting of: a mixture of the adhesive base of claim 3, water, and alkaline conditioning chemicals.

5. The wet adhesive of claim 4 wherein the alkaline conditioning chemicals consists of sodium hydroxide, calcium hydroxide, and sodium silicate.

6. Dry blood solids, soluble in aqueous alkaline medium, containing magnesium ions present in an amount up to 5% based on the weight of the blood solids and an ion-containing material present in an amount up to .5% based on the weight of the blood solids selected from the group consisting of cobalt ions, chromium ions, and mixtures thereof.

7. An alkaline adhesive composition, consisting of: an aqueous dispersion of animal blood solids, said blood solids being derived from blood selected from the group consisting of
   fresh blood,
   soluble dried blood,
   and mixtures thereof;
an alkali;
magnesium chloride present in an amount up to 5% based on weight of the blood solids;
and an additional substance present in an amount up to .5% based on the weight of the blood solids selected from the group consisting of cobalt sulfate, cobalt chloride, chromium sulfate, and mixtures thereof.

8. An adhesive composition according to claim 7 wherein the magnesium chloride is present in an amount up to about 2% of magnesium ions, and the additional substance is cobalt sulfate present in an amount up to about 0.25% of cobalt ions, both percentages being based on the weight of blood solids present.

9. An adhesive composition according to claim 7 wherein the magnesium chloride is present in an amount up to about 2% of magnesium ions, and the additional substance is chromium sulfate present in an amount up to about 0.25% of chromium ions, both percentages being based on the weight of blood solids present.

10. An alkaline adhesive composition, consisting of: an aqueous dispersion of animal blood solids, said blood solids being derived from blood selected from the group consisting of
    fresh blood,
    soluble dried blood,
    and mixtures thereof;
conditioning chemicals consisting of
    sodium hydroxide,
    lime, and
    sodium silicate;
magnesium chloride present in an amount up to 5% based on the weight of the blood solids;
and an additional substance present in an amount up to .5% based on the weight of the blood solids selected from the group consisting of cobalt sulfate, cobalt chloride, chromium sulfate, and mixtures thereof.

11. An adhesive composition according to claim 10 wherein the magnesium chloride is present in an amount up to about 2% of magnesium ions, and the additional substance is cobalt sulfate present in an amount up to about 0.25% of cobalt ions, both percentages being based on the weight of blood solids present.

12. An adhesive composition according to claim 10 wherein the magnesium chloride is present in an amount up to about 2% of magnesium ions, and the additional substance is chromium sulfate present in an amount up to about 0.25% of chromium ions, both percentages being based on the weight of blood solids present.

References Cited in the file of this patent

UNITED STATES PATENTS

| | | |
|---|---|---|
| 1,935,434 | Cohen | Nov. 14, 1933 |
| 2,308,185 | Lindsay et al. | Jan. 12, 1943 |
| 2,400,541 | Cone | May 21, 1946 |
| 2,874,134 | Gossett et al. | Feb. 17, 1959 |
| 3,095,571 | Cone | June 25, 1963 |